(12) United States Patent
Fukaya et al.

(10) Patent No.: US 9,676,947 B2
(45) Date of Patent: Jun. 13, 2017

(54) THERMOSETTING CONDUCTIVE PASTE

(71) Applicant: NORITAKE CO., LIMITED, Nagoya-shi, Aichi (JP)

(72) Inventors: Shuhei Fukaya, Obu (JP); Shigeru Sakamoto, Chiba (JP); Tatsuya Baba, Nagoya (JP)

(73) Assignee: NORITAKE CO., LIMITED, Aichi (JP)

( * ) Notice: Subject to any disclaimer, the term of this patent is extended or adjusted under 35 U.S.C. 154(b) by 163 days.

(21) Appl. No.: 14/575,622

(22) Filed: Dec. 18, 2014

(65) Prior Publication Data

US 2015/0175817 A1    Jun. 25, 2015

(30) Foreign Application Priority Data

Dec. 25, 2013   (JP) ................................. 2013-268064

(51) Int. Cl.
   *C09D 5/24*   (2006.01)
   *C09D 163/00*   (2006.01)

(52) U.S. Cl.
   CPC ............ *C09D 5/24* (2013.01); *C09D 163/00* (2013.01)

(58) Field of Classification Search
   CPC .................................. H01B 1/22; H01L 35/24
   USPC ................................... 252/514, 512
   See application file for complete search history.

(56) References Cited

U.S. PATENT DOCUMENTS

| | | | | |
|---|---|---|---|---|
| 7,198,736 B2 * | 4/2007 | Kasuga | ................... | H05K 1/095 252/514 |
| 7,751,174 B2 * | 7/2010 | Kimura | ................... | H01B 1/22 252/500 |
| 8,029,701 B2 * | 10/2011 | Kuwajima | ............... | H01B 1/02 252/500 |
| 2004/0094751 A1 * | 5/2004 | Ogiwara | .................. | H01B 1/22 252/500 |
| 2010/0193751 A1 * | 8/2010 | Heo | ......................... | H01B 1/22 252/514 |
| 2011/0186340 A1 * | 8/2011 | Kuramoto | ................ | H01B 1/22 174/260 |
| 2012/0228560 A1 * | 9/2012 | Jang | ......................... | C09J 11/04 252/514 |
| 2013/0153835 A1 * | 6/2013 | Hinotsu | ................... | H01B 1/16 252/514 |
| 2013/0270488 A1 * | 10/2013 | Ueyama | ................ | B22F 1/0018 252/512 |

FOREIGN PATENT DOCUMENTS

| | | |
|---|---|---|
| CN | 1500278 A | 5/2004 |
| JP | A-2001-64484 | 3/2001 |
| JP | A-2006-49148 | 2/2006 |
| JP | A-2007-179772 | 7/2007 |
| JP | A-2011-100573 | 5/2011 |
| WO | 02/080197 A1 | 10/2002 |

OTHER PUBLICATIONS

Jan. 17, 2017 Office Action issued in Chinese Patent Application No. 201410829725.1.

* cited by examiner

*Primary Examiner* — Douglas Mc Ginty

(74) *Attorney, Agent, or Firm* — Oliff PLC

(57) ABSTRACT

Provided is a heat curable conductive paste used to form a conductive coating. The heat curable conductive paste comprises a conductive powder, a heat curable epoxy resin and a curing agent. In the conductive powder, an aliphatic polyvalent carboxylic acid is adhered on a surface of a powdered metal core. The epoxy resin comprises a bifunctional or higher polyfunctional epoxy resin and a monofunctional epoxy resin, and the polyfunctional epoxy resin and the monofunctional epoxy resin have a mass ratio of 90:10 to 20:80.

14 Claims, 3 Drawing Sheets

THERMOSETTING CONDUCTIVE PASTE

BACKGROUND OF THE INVENTION

Field of the Invention

The present invention relates to a conductive paste. In particular, it relates to a heat curable conductive paste which forms a conductive coating when heated.

This application claims priority from Japanese Patent Application No. 2013-268064 filed on Dec. 25, 2013, the entire contents of which are incorporated herein by reference.

Description of the Related Art

Conventionally, conductive pastes have been widely used to form electrodes and wiring (circuit) patterns in electronic devices, etc. For instance, a heat curable conductive paste is preferably used to form electrodes and wiring patterns on substrates (e.g. conductive film) that are susceptible to performance degradation upon exposure to high temperatures.

A heat curable conductive paste is prepared by mixing conductive powder, heat curable resin and other ingredients (e.g. curing agent, filler, etc.) used as necessary into a paste form (including a slurry form and an ink form). Such a paste is applied in a desirable pattern to a substrate and dried by heating at a relatively low temperature (typically 100° C. to 300° C., e.g. 100° C. to 200° C.) to cure the heat curable resin, whereby a conductive coating (electrode, wiring pattern) can be formed. For example, Patent Documents 1 to 4 disclose heat curable conductive pastes that can be used for such purposes.

CITATION LIST

Patent Literature

[Patent Document 1] Japanese Patent Application Publication No. 2001-64484
[Patent Document 2] Japanese Patent Application Publication No. 2007-179772
[Patent Document 3] Japanese Patent Application Publication No. 2006-49148
[Patent Document 4] Japanese Patent Application Publication No. 2011-100573

SUMMARY OF THE INVENTION

Lately, for electronic devices and the like, there has been progress in the advancement of specifications such as miniaturization, densification, acceleration, and so on. Accordingly, thinner and finer electrodes and wiring patterns are in demand. In general, the electric resistance of a conductive coating increases inversely proportionally to the cross section area thereof. Thus, to make a thinner and finer coating, it is especially desired to further increase the electric conductivity (decrease the resistance).

The present invention has been made in such a point of view, with an objective thereof being to provide a heat curable conductive paste for forming a conductive coating having greater electric conductivity.

When a heat curable conductive paste is used, even after dried by heating, the heat curable resin will not burn off and remain in the resulting conductive coating. Heat curable resins are less conductive than conductive powders and play an important role in reducing the resistance of a conductive coating. The present inventors thus thought of optimizing the arrangement of a heat curable resin with respect to a conductive powder. After earnest investigations, a means capable of solving the problem was discovered, whereby the present invention was completed.

The present invention provides a heat curable conductive paste used for forming a conductive coating. Such a paste comprises a conductive powder, a heat curable epoxy resin and a curing agent. In the conductive powder, an aliphatic polyvalent carboxylic acid is adhered on a surface of a powdered metal core. The epoxy resin comprises a bifunctional or higher polyfunctional epoxy resin and a monofunctional epoxy resin, and the polyfunctional epoxy resin and the monofunctional epoxy resin have a mass ratio of 90:10 to 20:80.

By adhering a divalent or higher aliphatic carboxylic acid (aliphatic polyvalent carboxylic acid) to the powdered metal core surface, the amount of hydroxyl groups can be increased to obtain a hydrophilic conductive powder. Accordingly, the conductive powder surface will repel the hydrophobic epoxy resin and the epoxy resin will be less likely to adhere to the conductive powder surface. As a result, a smaller amount of the epoxy resin is present among particles of the conductive powder, allowing the particles to readily make contact with each other. Thus, the conductivity can be increased. In addition, by the use of a mixture of a monofunctional epoxy resin and a polyfunctional epoxy resin at the aforementioned ratio, while retaining adhesiveness and heat resistance, the glass transition temperature Tg of the epoxy resin (mixture) can be decreased to readily obtain the repellency.

Accordingly, the conductive paste disclosed herein allows forming a conductive coating having excellent adhesiveness, heat resistance and electric conductivity.

In a preferable embodiment disclosed herein, the powdered metal core comprises a spherical silver powder having an average aspect ratio (long diameter/short diameter ratio) of 1 to 1.5.

In general, since a spherical silver powder has a small inter-particle contact area, it tends to have a high resistivity (volume resistivity). In addition, since particles make contact at a "point," the presence of a resin at the point of contact tends to reduce the conductivity. Thus, the present invention can be applied particularly effectively.

The "aspect ratio" can be determined, for instance, by electron microscopy. More specifically, at least 30 (e.g. 30 to 100) metal particles (silver particles) are first observed with a scanning electron microscope (SEM). Subsequently, with respect to an image of each particle, the smallest rectangle circumscribing the particle is drawn and the ratio (A/B) of long side A to short side (e.g. thickness) B of such a rectangle is determined as the aspect ratio. The aspect ratios of a prescribed number of particles are arithmetically averaged to determine the average aspect ratio.

In a preferable embodiment disclosed herein, the spherical silver powder has an average particle diameter of 0.5 μm to 3 μm based on laser diffraction/light scattering spectroscopy. With the average particle diameter being in such a range, aggregation in the paste can be inhibited. Thus, a highly reliable coating can be consistently formed, and the effect of the present invention can be produced at a higher level.

With respect to a certain particle size distribution by volume based on conventional laser diffraction/light scattering spectroscopy, for the "average particle diameter," the $D_{50}$ particle diameter value (median diameter) can be used, which corresponds to the 50th percentile when cumulated from the smallest particle size.

In a preferable embodiment disclosed herein, the polyfunctional epoxy resin and the monofunctional epoxy resin have a mass ratio of 80:20 to 30:70. By using a mixture of the monofunctional epoxy resin and polyfunctional epoxy resin at the ratio, for instance, even if the drying temperature is set to 120° C., the resistivity can be kept at a low value (e.g. below 90 μΩ·cm). Thus, the effect of the present invention can be produced at a higher level.

Preferable examples of the polyfunctional epoxy resin include a bisphenol-based epoxy resin, novolac-based epoxy resin, naphthalene-based epoxy resin, dicyclopentadiene-based epoxy resin, tris(phenol methane)-based epoxy resin and the like.

Preferable examples of the monofunctional epoxy resin include an alkyl glycidyl ether, phenyl glycidyl ether, alkyl glycidyl ester, phenyl glycidyl ester and the like.

In a preferable embodiment disclosed herein, when the conductive powder is 100 parts by mass, the epoxy resin (mixture) is 5 to 15 parts by mass. As described earlier, even after a conductive coating is formed (dried), a residue of the resin in the heat curable conductive paste will remain in the coating. Thus, by keeping the epoxy resin content in this range, a coating of higher electron-conductivity can be formed while retaining suitable adhesiveness.

In another preferable embodiment disclosed herein, when the conductive powder is 100 parts by mass, the curing agent is 0.5 to 3 parts by mass. The curing agent contained in such a proportion allows easier application and provides greater curing ability.

DETAILED DESCRIPTION OF THE INVENTION

Preferred embodiments of the present invention are described below. Matters necessary to practice this invention (e.g. a preparation method for the heat curable conductive paste, etc.) other than those specifically referred to in this description (e.g. the composition of the heat curable conductive paste) may be understood as design matters to a person ordinarily skilled in the art based on the conventional art in the pertinent field. The present invention can be practiced based on the contents disclosed in this description and common technical knowledge in the subject field.

<<Heat Curable Conductive Paste>>

The heat curable conductive paste according to the present invention comprises as essential ingredients a conductive powder, a heat curable epoxy resin and a curing agent. The conductive powder is formed with a powdered metal core and an aliphatic polyvalent carboxylic acid adhered on a surface thereof. The epoxy resin (mixture) is characterized by comprising a bifunctional or higher polyfunctional epoxy resin and a monofunctional epoxy resin at a prescribed mass ratio. Other ingredients are thus not particularly limited and can be arbitrarily selected in light of various conditions. Various components can be added and their composition can be modified as well. The following describes the ingredients, etc. of the heat curable conductive paste disclosed herein.

<Conductive Powder>

Figure 1A:
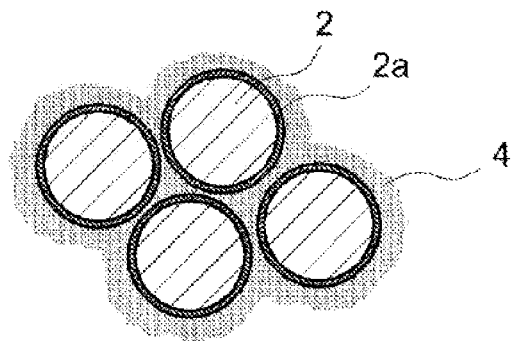
FIG. 1A shows a schematic diagram illustrating the arrangement of conductive powder and epoxy resin in a heat curable conductive paste according to an embodiment of the present invention.

As schematically illustrated in FIG. 1A, a conductive metal particle 2 constituting the conductive powder disclosed herein is present in a form where an aliphatic polyvalent carboxylic acid (divalent or higher aliphatic carboxylic acid) 2a is at least partially adhered to the surface of the metal particle core. For example, it has a form where the surface of the metal particle core is at least partially covered with the aliphatic polyvalent carboxylic acid 2a. From the standpoint of the structural stability, etc., the aliphatic carboxylic acid referred to herein may be partially or entirely modified. For example, it may be present as an aliphatic polyvalent carboxylate or as a carbonyl group ($-C(=O)^-$) obtained by eliminating hydrogen atoms from a structural moiety of the carboxylic acid.

The powdered metal core is a conductive substance to provide electric conductivity to the conductive coating. As for such a powdered metal, depending on the purpose, various kinds of metal, alloys thereof and the like having desirable conductivity and other physical properties can be considered. Examples include metals such as gold (Au), silver (Ag), copper (Cu), platinum (Pt), palladium (Pd), ruthenium (Ru), rhodium (Rh), iridium (Ir), osmium (Os), nickel (Ni), aluminum (Al), etc.; alloys thereof and the like. In particular, a single species of noble metal such as silver (Ag), platinum (Pt), palladium (Pd), etc., and an alloy thereof (silver-palladium (Ag—Pd), silver-platinum (Ag—Pt), silver-copper (Ag—Cu), etc.) are preferable. For relatively low costs and excellent electric conductivity, etc., metal particles formed of silver and of an alloy thereof are preferable.

The shape of the powdered metal core is not particularly limited. Various species having forms of spheres, flakes, scales, needles and so on are used. In particular, from the standpoint of manufacturing costs, substantially spherical metal particles are preferable. In the present description, the term "substantially spherical" encompasses the shapes of a sphere, rugby ball, polyhedron and the like, referring to, for instance, a shape having an average aspect ratio (long diameter/short diameter ratio) of 1 to 2 (typically 1 to 1.5, e.g. 1 to 1.2).

In general, when a spherical metal powder (e.g. spherical silver powder) is used, particles make contact at a "point," yielding a smaller inter-particle contact area in comparison to a case where a flakey or scale-like conductive powder is used. The resulting conductive coating thus tends to have a relatively high resistivity.

On the other hand, the invention disclosed herein allows reducing the presence of epoxy resin at points of contact among the conductive metal particles, by treating the metal powder surface with an aliphatic polyvalent carboxylic acid and controlling the composition of the epoxy resin. Accordingly, the inter-particle contact area can be significantly increased, allowing formation of a highly electric conductive coating even with the use of a spherical conductive powder (e.g. spherical silver powder) which tends to exhibit a high resistivity.

The average particle diameter of the powdered metal core is not particularly limited. It can be usually 0.1 μm or larger (typically 0.5 μm or larger, e.g. 0.8 μm or larger), but 5 μm or smaller (typically 3 μm or smaller, e.g. 2 μm or smaller). With the average particle diameter being 0.1 μm or larger, aggregation in the paste can be greatly inhibited, leading to greater handling properties. With the average particle diameter being 5 μm or smaller, the paste can have suitable fluidity (viscosity), leading to greater workability. Moreover, a dense conductive coating can be consistently formed in a thin layer or fine lines. Thus, with the average particle diameter being in this range, the effect of the present invention can be produced at a high level, allowing consistent formation of a highly reliable conductive coating.

The aliphatic polyvalent carboxylic acid provides high hydrophilicity to the surfaces of the metal particles. Since the aliphatic polyvalent carboxylic acid has two or more points of adhesion (carbonyl groups) per molecule, it is highly adsorptive (adhesive) to the metal powder surface. In other words, for instance, even if it is off the metal particle surface at one of the adhesion points, as long as it is adsorbed at another adhesion point, the molecule can remain on the metal particle surface; and therefore, it readily adheres to the metal particle surface and is thus preferred.

Examples of such an aliphatic polyvalent carboxylic acid include saturated aliphatic dicarboxylic acids such as oxalic acid, malonic acid, succinic acid, adipic acid, azelaic acid, sebacic acid, a dodecanedicarboxylic acid, etc.; unsaturated aliphatic dicarboxylic acids such as fumaric acid, maleic acid, itaconic acid, mesaconic acid, citraconic acid, hexahydrophthalic acid, tetrahydrophthalic acid, a dimer acid, a trimer acid, cyclohexanedicarboxylic acid, etc.; aromatic dicarboxylic acids such as terephthalic acid, isophthalic acid, ortho-phthalic acid, phenyllactic acid, phenoxyacetic acid, ascorbic acid, naphthalenedicarboxylic acid, etc.; aromatic oxocarboxylic acids such as p-oxybenzoic acid, etc.; their alkyl-substituted derivatives and alkenyl-substituted derivatives, aliphatic polyvalent carboxylates and the like. In particular, from the standpoint of the excellent adhesion to metal surfaces and dispersion stability of the conductive powder, an alkylsuccinic acid and/or an alkenylsuccinic acid are preferably used. Examples of polyvalent carboxylates include alkali metal salts (e.g. sodium salts, potassium salts), alkaline earth metal salts (e.g. magnesium salts, calcium salts) and the like. In particular, a succinic acid with an alkyl group or alkenyl group having a relatively long chain (e.g. having 5 or more carbons in the chain) is preferable. This can further inhibit aggregation in the paste.

Figure 1B:
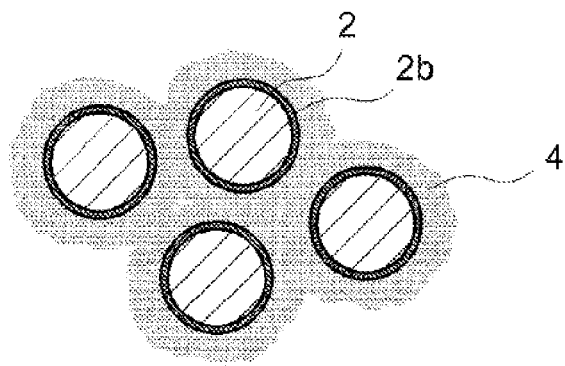
FIG. 1B shows a schematic diagram illustrating the arrangement of conductive powder and epoxy resin in a heat curable conductive paste according to the conventional art.

As schematically illustrated in FIG. 1B, to increase the dispersibility, feeling, antioxidative activity and so on in the paste, conventionally, surface treatments have been performed to allow an aliphatic monocarboxylic acid 2b (a monovalent aliphatic carboxylic acid, e.g. stearic acid, myristic acid, lauric acid, capric acid, etc.) to adhere to the surface of conductive metal particle 2. However, according to the research by the present inventors, when an aliphatic monocarboxylic acid is used, due to the poor hydrophilicity of the surface of conductive metal particle 2, the compatibility to a hydrophobic epoxy resin 4 sometimes increases. As a result, epoxy resin 4 is likely to stick to the conductive metal particle 2, causing the resin to be more likely present (involved) in a point of contact between conductive metal particles 2. Due to this, the conductive coating tends to have a relatively high resistivity.

On the other hand, in the invention disclosed herein, as schematically shown in FIG. 1A, a divalent or higher aliphatic carboxylic acid 2a is selectively used and allowed to adhere to the surface of the powdered metal core. This can provide more hydroxyl groups to the powdered metal surface. As a result, the wettability between the conductive metal particle 2 and the hydrophobic epoxy resin 4 can be reduced to generate an effect of repelling the epoxy resin 4. Accordingly, it can reduce the amount of epoxy resin 4 present at contact points among conductive metal particles 2 to inhibit the inter-particle contact, whereby the electric conductivity of the conductive coating can be increased.

A conductive powder in such an embodiment can be prepared by a heretofore known method (e.g. by a liquid-phase reaction of a powdered metal core and an aliphatic polyvalent carboxylic acid). The amount of adhered aliphatic polyvalent carboxylic acid can be, for instance, about 0.01 to 3 parts by mass (e.g. 0.01 to 1 part by mass) relative to 100 parts by mass of the powdered metal core.

The conductive powder content in the total solid content of the heat curable conductive paste is usually 50% by mass or higher, typically 60 to 99% by mass, for example, 70 to 98% by mass, or can be preferably about 80 to 95% by mass. When this range is satisfied, the paste will allow easy application and consistent formation of a conductive coating having greater electric conductivity.

<Heat Curable Epoxy Resin>

The epoxy resin is an ingredient to bring about great adhesion and durability. In the invention disclosed herein, the epoxy resin comprises a polyfunctional epoxy resin having two or more epoxy groups per molecule and a monofunctional epoxy resin having one epoxy group per molecule.

The use of the polyfunctional epoxy resin allows forming a conductive coating having excellent mechanical strength, durability and chemical resistance. However, if a polyfunctional epoxy resin is used solely, as schematically shown in FIG. 2B, a polyfunctional epoxy resin 4b tends to have a glass transition temperature Tg higher than the temperature setting for drying by heating. Thus, the polyfunctional epoxy resin 4b hardly flows when being heated to dry. Accordingly, epoxy resin 4b will be present to a great extent at a point of contact between conductive metal particles 2, making it difficult for the conductive metal particles 2 to come in contact. As a result, the resistivity tends to increase. According to the research by the present inventors, such a tendency is notable especially when a substantially spherical conductive powder is used.

Figure 2A:
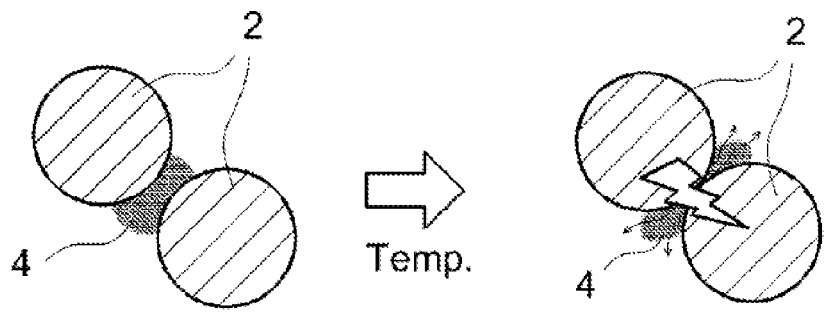
FIG. 2A shows a schematic diagram illustrating the arrangement of conductive powder and epoxy resin in a conductive coating according to an embodiment of the present invention.
Figure 2B:
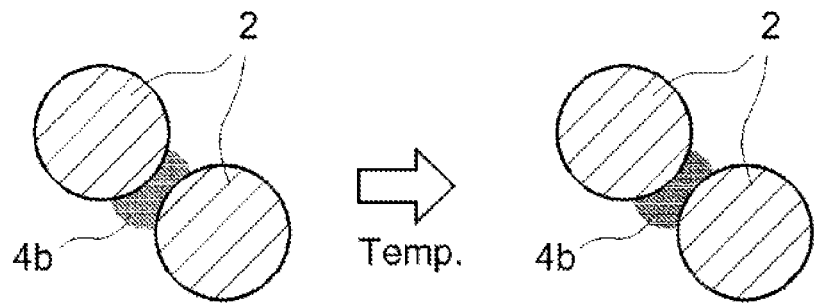
FIG. 2B shows a schematic diagram illustrating the arrangement of conductive powder and epoxy resin in a conductive coating according to the conventional art.

As schematically illustrated in FIG. 2A, in the art disclosed herein, a polyfunctional epoxy resin is thus mixed with a monofunctional epoxy resin. This reduces crosslinking points in epoxy resin 4 and decreases the glass transition temperature Tg of the resin. As a result, for instance, even when the drying was carried out by heating at a low temperature of, for instance, 200° C. or below (typically 150° C. or below), the epoxy resin 4 is allowed to readily flow when being heated to dry. Hence, the effect of repelling (eliminating) the epoxy resin 4 present at the point of contact between conductive metal particles 2 can be readily obtained.

Examples of the polyfunctional epoxy resin having two or more functional groups include a bisphenol-A-based epoxy resin, bisphenol-F-based epoxy resin, phenol-novolac-based epoxy resin, cresol-novolac-based epoxy resin, naphthalene-based epoxy resin, dicyclopentadiene-based epoxy resin, tris(phenol methane)-based epoxy resin, phenol aralkyl-based epoxy resin, polyfunctional phenol-based epoxy resin, bisphenol-based epoxy resin, glycidyl ester-based epoxy resin, glycidyl amine-based epoxy resin, anthracene-based epoxy resin, hydroquinone-based epoxy resin and the like. These can be used singly as one species or in a suitable combination of two or more species.

In particular, from the standpoint of the adhesion, hydrophobicity and availability, a bisphenol-based epoxy resin, novolac-based epoxy resin, naphthalene-based epoxy resin, dicyclopentadiene-based epoxy resin and tris(phenol methane)-based epoxy resin are preferable.

The equivalent weight of epoxy groups in the polyfunctional epoxy resin is not particularly limited. To obtain good adhesion and the effect of the present invention at a high level, it can be about 100 g/eq to 3000 g/eq (e.g. 150 g/eq to 1000 g/eq). The equivalent weight of epoxy groups can be determined according to JIS K7236 (2009). For the same reasons, the polyfunctional epoxy resin may have a weight average molecular weight Mw of about 100 to 5000 (typically 150 to 4000, e.g. 200 to 1000). The weight average molecular weight Mw can be determined by general gel permeation chromatography (GPC).

Examples of the monofunctional epoxy resin (epoxy resin having a single functional group) include glycidyl ether-based epoxy resins such as an alkyl glycidyl ether, alkylphenyl glycidyl ether, alkenyl glycidyl ether, alkynyl glycidyl ether, phenyl glycidyl ether and the like, having 6 to 36 (typically 6 to 26, e.g. 6 to 18) carbon atoms; glycidyl ester-based epoxy resins such as an alkyl glycidyl ester, alkenyl glycidyl ester, phenyl glycidyl ester and the like, having 6 to 36 (typically 6 to 26, e.g. 6 to 18) carbon atoms; and the like. These can be used singly as one species or in a suitable combination of two or more species.

In particular, an alkyl glycidyl ether, phenyl glycidyl ether, alkyl glycidyl ester or phenyl glycidyl ester is preferably used. In particular, a phenyl glycidyl ether is preferably used.

In a preferable embodiment, the weight equivalent of the monofunctional epoxy resin is, for instance, about 100 g/eq to 500 g/eq.

In another preferable embodiment, the weight average molecular weight Mw is about 100 to 500.

In the epoxy resin disclosed herein, the polyfunctional epoxy resin and the monofunctional epoxy resin have a mass ratio of 90:10 to 20:80. In other words, the polyfunctional epoxy resin content in the total epoxy resin is 20% by mass or higher (preferably 30% by mass or higher, more preferably 40% by mass or higher), but 90% by mass or lower (preferably 80% by mass or lower, more preferably 70% by mass or lower, e.g. 60% by mass or lower). The monofunctional epoxy resin content in the total epoxy resin is 10% by mass or higher (preferably 20% by mass or higher, more preferably 30% by mass or higher, e.g. 40% by mass or higher), but 80% by mass or lower (preferably 70% by mass or lower, more preferably 60% by mass or lower).

A polyfunctional epoxy resin content far above the prescribed range will increase the glass transition temperature Tg of the backbone resin, making the epoxy resin less fluid. This will give rise to the presence of the epoxy resin at a point of contact in the conductive powder and the conductivity may decrease.

On the other hand, a monofunctional epoxy resin far above the prescribed range will result in an excessively low glass transition temperature Tg, allowing the epoxy resin to flow more freely than necessary. This may cause aggregation of the conductive powder or localization (rising) of the epoxy resin and reduce the electric conductivity or reliability of the conductive coating.

When the epoxy resin composition is in the prescribed range, while retaining good adhesion, the resistivity can be controlled, for instance, as low as or lower than 50 μΩ·cm when the drying is carried out by heating at 150° C. for 30 minutes and whereby a highly practical conductive coating can be consistently formed.

In a preferable embodiment, the polyfunctional epoxy resin and the monofunctional epoxy resin have a mass ratio of 80:20 to 30:70 (more preferably 70:30 to 40:60). The epoxy resin having such a composition can bring about even higher conductivity. For example, when the drying is carried out by heating at 120° C. for 30 minutes, the resistivity can be controlled as low as or lower than 150 μΩ·cm (more preferably 90 μΩ·cm or lower), whereby the effect of the present invention can be obtained at a higher level.

In typical, the polyfunctional epoxy resin and monofunctional epoxy resin are completely miscible to each other regardless of their mixing ratio. The epoxy resin (mixture) disclosed herein may generally have a glass transition temperature Tg of 50° C. to 200° C. For example, when the heating temperature for curing is set to about 100° C. to 150° C., from the standpoint of increasing the fluidity, the glass transition temperature Tg of the epoxy resin can be 50° C. or above or typically 80° C. or above, for instance, 90° C. or above. When Tg is too high, the curing may not proceed sufficiently or the effect of the present invention may diminish. Thus, the upper limit can be 150° C. or below or typically 120° C. or below, for instance, 100° C. or below. The glass transition temperature Tg can be measured by general differential scanning calorimetry (DSC).

When the conductive powder is 100 parts by mass, the epoxy resin content can be, for instance, 2 parts by mass or higher (preferably 5 parts by mass or higher), but 20 parts by mass or lower (preferably 15 parts by mass or lower). With the epoxy resin content being 2 or more parts by mass (preferably 5 or more parts by mass), greater adhesion and durability can be obtained. When the epoxy resin content is 20 parts by mass or less (preferably 15 parts by mass or less), the resistivity can be further decreased.

The epoxy resin content in the total solid content of the heat curable conductive paste can be usually 1% by mass or higher (typically 2% by mass or higher, preferably 3% by mass or higher), but typically 30% by mass or lower (typically 20% by mass or lower, e.g. 15% by mass or lower). When this range is satisfied, a conductive coating having even greater adhesiveness and durability can be consistently formed.

<Curing Agent>

The curing agent is not particularly limited. Those known to be usable in heat curable conductive pastes can be suitably used. Typically, a compound having a functional group that reacts with the epoxy group in the epoxy resin to form a cross-linked structure can be used. Examples include an imidazole-based curing agent and their derivatives, acid anhydride-based curing agent, phenol-based curing agent, curing agent based on amines such as aliphatic amines, polyether amines, aromatic amines, etc., amide-based curing agent, isocyanate-based curing agent, organic phosphine and the like. These can be used singly as one species or in a suitable combination of two or more species.

When the conductive powder is 100 parts by mass, the curing agent content is usually 0.1 part by mass or higher (preferably 0.5 part by mass or higher, e.g. 1 part by mass or higher), but 5 parts by mass or lower (preferably 3 parts by mass or lower, e.g. 2 parts by mass or lower). With the amount of curing agent being 0.1 part by mass or higher (preferably 0.5 part by mass or higher), incomplete curing can be greatly prevented and the curing reaction is allowed to progress smoothly. When the amount of curing agent is 5 parts by mass or lower (preferably 3 parts by mass or lower), it can prevent unreacted curing agent from remaining and further decrease the resistivity. Thus, by using the conductive powder in the prescribed range, the effect of the present invention can be produced at a higher level.

The curing agent content in the total solid content of heat curable conductive paste can be usually 0.1% by mass or higher (typically 0.5% by mass or higher, e.g. 1% by mass or higher), but typically 5% by mass or lower (typically 3% by mass or lower, e.g. 2% by mass or lower). When this range is satisfied, a conductive coating can be formed precisely and consistently.

<Other Components>

A typical example of the heat curable conductive paste comprises an organic dispersion medium (typically an organic solvent) to disperse the ingredients. This allows adjusting the viscosity and thixotropy of the paste to increase the workability and allow easier application.

Examples of organic dispersion media include glycol-based solvents such as ethylene glycol propylene glycol, diethylene glycol, etc.; glycol ether-based solvents such as ethylene glycol monomethyl ether (methyl cellosolve), ethylene glycol monoethyl ether (cellosolve), diethylene glycol monobutyl ether (butyl carbitol), diethylene glycol monobutyl ether acetate, dipropylene glycol methyl ether, dipropylene glycol methyl ether acetate, propylene glycol phenyl ether, 3-methyl-3-methoxybutanol, etc.; ester-based solvents such as 1,7,7-trimethyl-2-acetoxy-bicyclo-[2,2,1]-heptane, 2,2,4-trimethyl-1,3-pentadiol monoisobutylate, etc.; alcohol-based solvents such as terpineol, dihydroterpineol, dihydroterpinyl propionate, benzyl alcohol, etc.; hydrocarbon-based solvents such as toluene, xylene, etc.; other organic solvents having high boiling points such as mineral sprit, etc.; and the like.

In the heat curable conductive paste disclosed herein, in addition to the aforementioned ingredients (i.e. a conductive powder, epoxy resin, curing agent and organic dispersion medium), various additives can be added as necessary. Examples of such additives include an inorganic filler, surfactant, dispersing agent, tackifier, antifoaming agent, plasticizer, stabilizer, antioxidant, pigments, etc. As these additives, materials known to be usable in heat curable conductive pastes can be suitably used.

The additive content in the total solid content of heat curable conductive paste can be, for instance, 5% by mass or lower (preferably 3% by mass or lower, more preferably 1% by mass or lower).

<Preparation of Paste>

Such a paste can be prepared by weighing out the aforementioned materials to a prescribed ratio (mass ratio) and uniformly mixing these. The materials can be mixed with various conventional mixing devices such as a three roll mill, magnetic stirrer, planetary mixer, disper and the like. The paste viscosity is not particularly limited as it varies depending on the formation method, thickness, etc., of the conductive coating. For example, it can be prepared to have a viscosity of 10 Pa·s to 100 Pa·s (e.g. 20 Pa·s to 50 Pa·s) when measured by a Brookfield-type viscometer with a suitable spindle (e.g. No. 4 spindle) at a temperature of 25° C. at a rotational speed of 100 rpm. This can increase the workability and handling properties and conductive coatings can be formed further consistently.

<Formation of Conductive Coating>

The heat curable conductive paste disclosed herein is used to form a conductive coating. For forming a conductive coating, a paste disclosed herein and a desirable substrate are first obtained. The paste is then applied (spread) to the substrate to a prescribed thickness (e.g. 1 µm to 50 µm). The coating thickness can be modified depending on the number of applications, paste viscosity, etc. The paste can be applied, for instance, by screen printing or with a bar coater, slit coater, gravure coater, dip coater, spray coater, etc. After applied, by a suitable drying means such as a dryer, etc., the paste can be dried to cure by heating at a prescribed temperature (typically 200° C. or below, e.g. 100° C. to 150° C., preferably 100° C. to 120° C.) for a prescribed time period (typically 1 to 60 minutes, e.g. 10 to 30 minutes). A conductor in a film form (a conductive coating) can be thus fabricated.

The heat curable conductive paste disclosed herein can be heated typically at 200° C. or below (preferably 150° C. or below, e.g. 120° C. or below) to form a conductive coating that is highly adhesive and have great electric conductivity. Therefore, it can be preferably used to form an electrode or wiring pattern on a substrate formed of a poorly heat-resistant material. Typical applications include forming a conductive circuit of a touchscreen comprising, as the substrate, a glass coated with ITO (indium tin oxide) or a resin film such as polypropylene (PP), polyethylene terephthalate (PET), polyethylene naphthalate (PEN) and the like.

Some worked examples are described below, relating to the present invention. However, the present invention is not intended to be limited to those shown in the worked examples.

The following materials were obtained in advance as ingredients to form heat curable conductive pastes:

<Conductive Powders>

Conductive powder A: spherical silver powder (available from DOWA Electronics Materials Co., Ltd.; $D_{50}$=0.9 µm, 1.2 aspect ratio) with octadecanyl succinic acid-treated surface Conductive powder B: spherical silver powder (available from DOWA Electronics Materials Co., Ltd.; $D_{50}$=1.3 µm) with octadecanyl succinic acid-treated surface Conductive powder C: spherical silver powder (available from DOWA Electronics Materials Co., Ltd.; $D_{50}$=2.0 µm) with octadecanyl succinic acid-treated surface Conductive powder D: spherical silver powder (available from DOWA Electronics Materials Co., Ltd.; $D_{50}$=0.9 µm, 1.2 aspect ratio)

<Polyfunctional Epoxy Resins>

Polyfunctional epoxy resin A: bisphenol F-based epoxy resin (available from ADEKA Corporation, epoxy equivalent weight 170 g/eq, weight average molecular weight Mw 340)

Polyfunctional epoxy resin B: novolac-based epoxy resin (available from Nippon Kayaku Co., Ltd.; epoxy equivalent weight 193 g/eq, weight average molecular weight Mw 1100)

Polyfunctional epoxy resin C: naphthalene-based epoxy resin (available from DIC Corporation; epoxy equivalent weight 172 g/eq, weight average molecular weight Mw 550)

Polyfunctional epoxy resin D: tris(phenol methane)-based epoxy resin (available from Printec Inc.; epoxy equivalent weigh 208 g/eq, weight average molecular weight Mw 600)

Polyfunctional epoxy resin E: dicyclopentadiene-based epoxy resin (available from DIC Corporation; epoxy equivalent weight 258 g/eq, weight average molecular weight Mw 550)

Polyfunctional epoxy resin F: bisphenol A-based epoxy resin (available from Mitsubishi Chemical Corporation; epoxy equivalent weight 899 g/eq, weight average molecular weight Mw 1650)

Polyfunctional epoxy resin G: bisphenol A-based epoxy resin (available from Mitsubishi Chemical Corporation; epoxy equivalent weight 2744 g/eq, weight average molecular weight Mw 3800)

<Monofunctional Epoxy Resin>

Phenyl glycidyl ether (available from ADEKA Corporation, epoxy equivalent weight 206 g/eq, weight average molecular weight Mw 210)

<Curing Agent>

Imidazole-based curing agent (available from Ajinomoto Fine-Techno Co., Inc.)

Subsequently, these materials were mixed and allowed to stir in an organic dispersion medium (diethylene glycol monobutyl ether acetate was used here) at the compositional ratios shown in Table 1 and Table 2 to prepare heat curable conductive pastes (Example 1 to Example 24). To surfaces of ITO-coated glass substrates available from Nippon Electric Glass Co., Ltd., by a means of screen printing, the resulting pastes were applied each in a 2 cm by 2 cm square pattern at about 10 μm thickness. For each example, by heating to dry at 120° C. for 30 minutes and at 150° C. for 30 minutes, two separate conductive coatings dried at the varied heating temperatures were formed on the substrates, respectively.

<Measurement of Resistivity>

The coatings formed were subjected to resistivity (volume resistivity) measurements by four-terminal four-probe method, using a resistivity meter (model: LORESTA GP MCP-T610) available from Mitsubishi Chemical Analytech Co., Ltd. The results are shown in "Resistivity" rows in Table 1 and Table 2. The temperatures following resistivity values indicate the heating temperatures used for curing.

<Evaluation of Adhesion>

The resulting heat curable conductive pastes (Example 1 to Example 24) were subjected to adhesion tests (cross-cut tests) according to JIS K5400 (1990). The results are shown in "Cross-cut test" rows in Table 1 and Table 2. In these rows, the symbol "E (excellent)" indicates absence of peeling; "G (good)" indicates the presence of peeling to an extent with a slightly chipped edge; and "P (poor)" indicates the presence of peeling as large as or larger than a single square.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Composition (parts by mass) | Conductive powder A | 100 | 100 | 100 | 100 | 100 | 100 | 100 | 100 | 100 | 100 | 100 | 100 | 100 |
| | Polyfunctional epoxy resin A | 5.9 | — | — | — | — | — | — | — | — | — | — | — | — |
| | Polyfunctional epoxy resin B | — | 5.9 | — | — | — | — | — | 8.1 | 7.2 | 4.5 | 3.1 | 2.3 | 1.8 |
| | Polyfunctional epoxy resin C | — | — | 5.9 | — | — | — | — | — | — | — | — | — | — |
| | Polyfunctional epoxy resin D | — | — | — | 5.9 | — | — | — | — | — | — | — | — | — |
| | Polyfunctional epoxy resin E | — | — | — | — | 5.9 | — | — | — | — | — | — | — | — |
| | Polyfunctional epoxy resin F | — | — | — | — | — | 5.9 | — | — | — | — | — | — | — |
| | Polyfunctional epoxy resin G | — | — | — | — | — | — | 5.9 | — | — | — | — | — | — |
| | Monofunctional epoxy resin | 3.1 | 3.1 | 3.1 | 3.1 | 3.1 | 3.1 | 3.1 | 0.9 | 1.8 | 4.5 | 5.9 | 6.7 | 7.2 |
| | Curing agent | 1 | 1 | 1 | 1 | 1 | 1 | 1 | 1 | 1 | 1 | 1 | 1 | 1 |
| Ratio in epoxy resin (% by mass) | Poly- | 65 | 65 | 65 | 65 | 65 | 65 | 65 | 90 | 80 | 50 | 35 | 25 | 20 |
| | Mono- | 35 | 35 | 35 | 35 | 35 | 35 | 35 | 10 | 20 | 50 | 65 | 75 | 80 |
| Resistivity (×10⁻⁵ Ωcm) | 120° C. | 13 | 5.4 | 8.4 | 41 | 16 | 220 | 2100 | 9.4 | 7.3 | 8 | 12 | 14 | 19 |
| | 150° C. | 5.4 | 2.9 | 4.2 | 7.2 | 5.6 | 41 | 140 | 4.1 | 3.3 | 4.1 | 4.3 | 4.6 | 5.4 |
| Cross-cut test | | E | E | E | E | E | E | E | G | G | E | E | E | E |

TABLE 2

| | | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|---|---|---|---|
| Composition (parts by mass) | Conductive powder A | — | — | 100 | 100 | — | — | 100 | 100 | 100 | 100 | 100 | 100 | 100 |
| | Conductive powder B | 100 | — | — | — | — | — | — | — | — | — | — | — | — |
| | Conductive powder C | — | 100 | — | — | — | — | — | — | — | — | — | — | — |
| | Conductive powder D | — | — | — | — | 100 | 100 | — | — | — | — | — | — | — |
| | Polyfunctional epoxy resin A | — | — | 9 | — | 6 | — | — | — | — | — | — | — | — |
| | Polyfunctional epoxy resin B | 5.9 | 5.9 | — | 9 | — | 6 | 8.7 | 8.4 | 0.9 | — | — | — | — |
| | Polyfunctional epoxy resin C | — | — | — | — | — | — | — | — | — | — | — | — | — |
| | Polyfunctional epoxy resin D | — | — | — | — | — | — | — | — | — | — | — | — | — |
| | Polyfunctional epoxy resin E | — | — | — | — | — | — | — | — | — | — | — | — | — |
| | Polyfunctional epoxy resin F | — | — | — | — | — | — | — | — | — | 9 | — | 5.9 | — |

TABLE 2-continued

|  | | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|---|---|---|---|
| | Polyfunctional epoxy resin G | — | — | — | — | — | — | — | — | — | — | 9 | — | 5.9 |
| | Monofunctional epoxy resin | 3.1 | 3.1 | — | — | 3 | 3 | 0.3 | 0.6 | 8.1 | — | — | 3.1 | 3.1 |
| | Curing agent | 1 | 1 | 1 | 1 | 1 | 1 | 1 | 1 | 1 | 0.3 | 0.1 | 0.3 | 0.1 |
| Ratio in epoxy resin (% by mass) | Poly- | 65 | 65 | 100 | 100 | 65 | 65 | 97 | 94 | 10 | 100 | 100 | 65 | 65 |
| | Mono- | 35 | 35 | 0 | 0 | 35 | 35 | 3 | 6 | 90 | 0 | 0 | 35 | 35 |
| Resistivity ($\times 10^{-5}$ Ωcm) | 120° C. | 6.1 | 7.6 | 18 | 54 | 25 | 9.1 | 160 | 32 | 9.0E+05 | 5.0E+08 | 2.5E+09 | 1.5E+08 | 1.5E+08 |
| | 150° C. | 3.6 | 5.7 | 11 | 9.3 | 8.1 | 6.0 | 11 | 8.1 | 8.2 | 1.6E+08 | 1.9E+08 | 5.4E+07 | 7.1E+07 |
| | 200° C. | | | | | | | | | | 15 | 44 | 4.1 | 7.9 |
| Cross-cut test | | E | E | E | G | E | E | G | G | E | E | E | E | E |

As shown in Table 2, Examples 16 and 17 using a polyfunctional epoxy resin alone (using no monofunctional epoxy resin) exhibited relatively high resistivity values as compared to Examples 1 and 2 using a mixture of a polyfunctional epoxy resin and a monofunctional epoxy resin. Based on this, the conductivity cannot be increased solely by the presence of an aliphatic polyvalent carboxylic acid adhered on the conductive powder. The combined use of a polyfunctional epoxy resin and a monofunctional epoxy resin is found necessary.

Conversely, Examples 18 and 19 (using conductive powder D) with no aliphatic polyvalent carboxylic acid adhered on the conductive powder surface also showed relatively high resistivity values as compared to Examples 1 and 2 with an aliphatic polyvalent carboxylic acid adhered on the conductive powder surface. From this, it has been found that the conductivity cannot be increased solely by the combined use of a polyfunctional epoxy resin and a monofunctional epoxy resin, and the presence of an aliphatic polyvalent carboxylic acid adhered on the conductive powder surface is necessary.

In contrast, as shown in Table 1, the resistivity was relatively low in both samples heated at 120° C. and 150° C. in Examples 1 and 2 each having the presence of an aliphatic polyvalent carboxylic acid adhered on the conductive powder and using a mixture of a polyfunctional epoxy resin and a monofunctional epoxy resin as the heat curable resin. Such results indicate the technical significance of the present invention.

As shown by Examples 3 to 7 in Table 1, polyfunctional epoxy resins C to G were also subjected to the same tests as the polyfunctional epoxy resins A and B. In every case, the resistivity was reduced in the presence of an aliphatic polyvalent carboxylic acid adhered on the conductive powder surface in combination with the use of a mixture of a polyfunctional epoxy resin and a monofunctional epoxy resin as the heat curable resin. In particular, as the polyfunctional epoxy resin, for example, a bisphenol-based epoxy resin, novolac-based epoxy resin, naphthalene-based epoxy resin, tris(phenol methane)-based epoxy resin, dicyclopentadiene-based epoxy resin and the like are found useful. Among these, the use of a novolac-based epoxy resin is found to bring about the lowest resistivity (Example 2). The relatively high resistivity values in Examples 6 and 7 are thought due to the use of polyfunctional epoxy resins having high molecular weights with large epoxy equivalent weights.

By comparing Example 2 shown in Table 1 and Examples 14 and 15 shown in Table 2, a metal powder having an average particle diameter of about 0.5 μm to 3 μm is found useful as the core of conductive powder. In particular, the resistivity is found to be minimized when the average particle diameter is small (Example 1).

The polyfunctional epoxy resin to monofunctional epoxy resin mixing ratio is discussed next.

Figure 3:
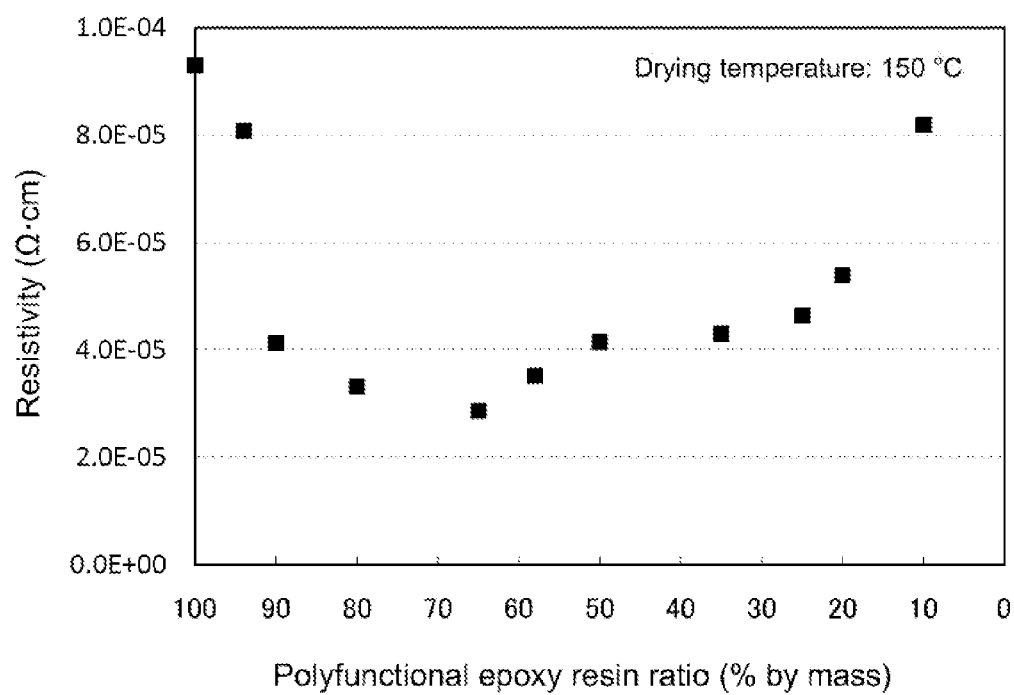
FIG. 3 shows a graph plotting resistivity values of conductive coatings dried by heating at 150° C.
Figure 4:
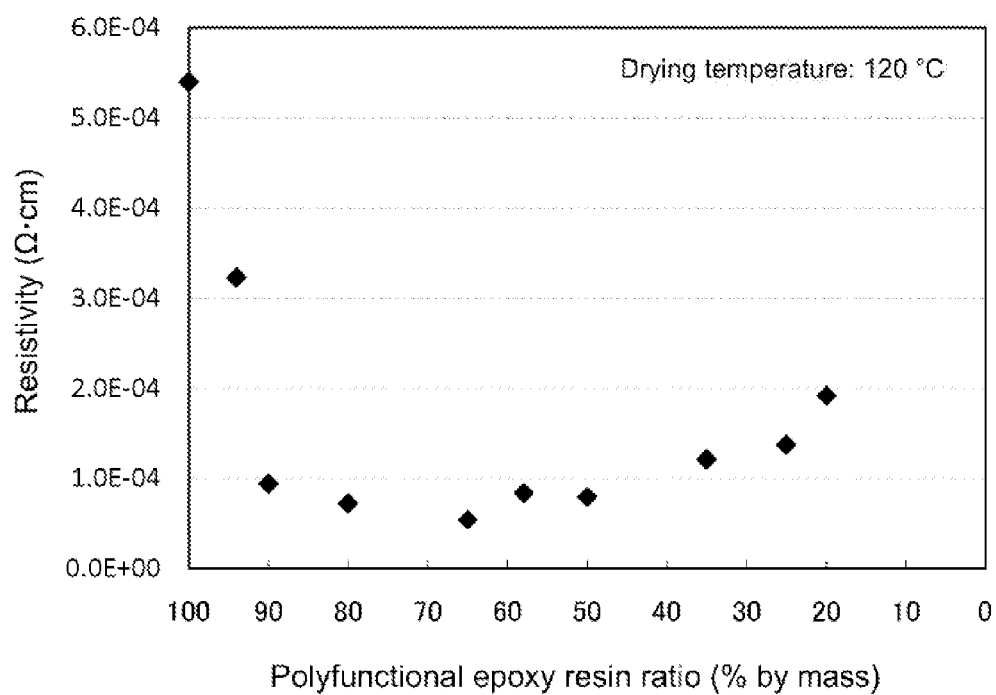
FIG. 4 shows a graph plotting resistivity values of conductive coatings dried by heating at 120° C.

The resistivity values of Examples 3, 8 to 13, 17 and 20 to 22 are shown in FIG. 3 and FIG. 4. FIG. 3 shows the resistivity of the conductive coatings dried by heating at 150° C. while FIG. 4 shows the resistivity of the conductive coatings dried by heating at 120° C.

As shown in FIG. 3, when the polyfunctional epoxy resin content in the total epoxy resin was 20 to 90% by mass, the resistivity was as low as or lower than 60 μΩ·cm (typically 50 μΩ·cm or lower) with samples dried at 150° C. for 30 minutes. In particular, it has been found that with the polyfunctional epoxy resin content being 55 to 80% by mass, the resistivity can be reduced to or below 40 μΩ·cm (e.g. 35 μΩ·cm or lower); and especially, with a 60 to 70% by mass polyfunctional epoxy resin content, the resistivity can be made as low as or lower than 30 μΩ·cm.

As shown in FIG. 4, when the polyfunctional epoxy resin content in the total epoxy resin was 40 to 90% by mass, the resistivity was as low as or lower than 100 μΩ·cm (typically 80 μΩ·cm or lower) with samples dried at 120° C. for 30 minutes. In particular, it has been found that with the polyfunctional epoxy resin content being 55 to 70% by mass, the resistivity can be reduced to or below 600 μΩ·cm (e.g. 55 μΩ·cm or lower).

In addition, from comparison among Examples 6 and 7 shown in Table 1 and Examples 25 and 26 shown in Table 2, the effect of the present invention is found more significant when 0.5 part by mass or more (e.g. 1 part by mass or more) of a curing agent is added relative to 100 parts by mass of conductive powder. This was thought to be the case because with a smaller amount of curing agent, due to the molecular weight, the curing reaction did not progress sufficiently. Examples 23 and 24 shown in Table 2 correspond to Examples 25 and 26, respectively. These results indicate that, for instance, even when a curing agent is added in an amount smaller than the range indicated above, by applying the present invention, the resistivity can be greatly reduced (e.g. The resistivity can be reduced to about one-third to one-fifth in a product calcined at 200° C.).

Although the present invention is described in detail above, these are merely examples. Various modifications can be made to the present invention within the scope of claims.

REFERENCE SIGNS LIST 2 conductive metal particle
2a aliphatic polyvalent carboxylic acid
2b aliphatic monocarboxylic acid

The invention claimed is:

1. A heat curable conductive paste adapted for forming a conductive coating, the paste comprising a conductive powder, a heat curable epoxy resin and a curing agent, wherein
in the conductive powder, an aliphatic polyvalent carboxylic acid is adhered on a surface of a powdered metal core, and
the epoxy resin comprises a polyfunctional epoxy resin having two or more epoxy groups per molecule and a monofunctional epoxy resin having one epoxy group per molecule, with the polyfunctional epoxy resin and the monofunctional epoxy resin having a mass ratio of 90:10 to 20:80.

2. The heat curable conductive paste according to claim 1, wherein the powdered metal core comprises a spherical silver powder having an average aspect ratio (long diameter/short diameter ratio) of 1 to 1.5.

3. The heat curable conductive paste according to claim 2, wherein the spherical silver powder has an average particle diameter of 0.5 μm to 3 μm based on laser diffraction/light scattering spectroscopy.

4. The heat curable conductive paste according to claim 1, wherein the polyfunctional epoxy resin and the monofunctional epoxy resin have a mass ratio of 80:20 to 30:70.

5. The heat curable conductive paste according to claim 1, wherein the polyfunctional epoxy resin comprises one, two or more species selected from a group consisting of a bisphenol-based epoxy resin, a novolac-based epoxy resin, a naphthalene-based epoxy resin, a dicyclopentadiene-based epoxy resin, and a tris(phenol methane)-based epoxy resin.

6. The heat curable conductive paste according to claim 1, wherein the monofunctional epoxy resin comprises one, two or more species selected from a group consisting of an alkyl glycidyl ether, a phenyl glycidyl ether, an alkyl glycidyl ester, and a phenyl glycidyl ester.

7. The heat curable conductive paste according to claim 1, wherein when the conductive powder is 100 parts by mass, the epoxy resin content is 5 to 15 parts by mass and the curing agent content is 0.5 to 3 parts by mass.

8. The heat curable conductive paste according to claim 1, wherein the conductive powder is present in an amount of 50% by mass or higher, based on total solid content of the heat curable conductive paste.

9. The heat curable conductive paste according to claim 1, wherein the conductive powder is present in an amount of 60 to 99% by mass, based on total solid content of the heat curable conductive paste.

10. The heat curable conductive paste according to claim 1, wherein the conductive powder is present in an amount of 70 to 98% by mass, based on total solid content of the heat curable conductive paste.

11. The heat curable conductive paste according to claim 1, wherein the conductive powder is present in an amount of 80 to 95% by mass, based on total solid content of the heat curable conductive paste.

12. The heat curable conductive paste according to claim 1, wherein the polyfunctional epoxy resin has an equivalent weight of epoxy groups of 100 g/eq to 3000 g/eq and a weight average molecular weight Mw of about 100 to 5000.

13. The heat curable conductive paste according to claim 1, wherein the monofunctional epoxy resin has an equivalent weight of epoxy groups of 100 g/eq to 500 g/eq and a weight average molecular weight Mw of about 100 to 500.

14. The heat curable conductive paste according to claim 1, wherein the aliphatic polyvalent carboxylic acid comprises succinic acid having an alkyl or alkenyl chain of 5 or more carbon atoms.

* * * * *